(12) United States Patent
Zhu et al.

(10) Patent No.: US 10,375,580 B2
(45) Date of Patent: Aug. 6, 2019

(54) HIGHER ORDER MU-MIMO FOR LTE-A

(71) Applicant: Intel Corporation, Santa Clara, CA (US)

(72) Inventors: Yuan Zhu, Chao Yang District (CN); Alexei Vladimirovich Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/717,687

(22) Filed: Sep. 27, 2017

(65) Prior Publication Data
US 2018/0035302 A1     Feb. 1, 2018

Related U.S. Application Data

(63) Continuation of application No. 13/995,155, filed as application No. PCT/US2011/053903 on Sep. 29, 2011, now Pat. No. 9,807,617.

(51) Int. Cl.
*H04W 16/14* (2009.01)
*H04L 1/06* (2006.01)
(Continued)

(52) U.S. Cl.
CPC .......... *H04W 16/14* (2013.01); *H04B 7/0452* (2013.01); *H04B 7/0665* (2013.01);
(Continued)

(58) Field of Classification Search
CPC ................................................. H04W 16/14
See application file for complete search history.

(56) References Cited

U.S. PATENT DOCUMENTS 9,807,617 B2 * 10/2017 Zhu ..................... H04W 16/14
2008/0212701 A1 * 9/2008 Pan ..................... H04B 7/0417
375/260

(Continued)

FOREIGN PATENT DOCUMENTS

| WO | 2008/103313 A2 | 8/2008 |
| WO | 2010/069242 A1 | 6/2010 |
| WO | 2013/048401 A1 | 4/2013 |

OTHER PUBLICATIONS

WO2011046349 Method and Apparatus for Providing Downlink Reference Signal Transmission Power Information in a Wireless Communication System That Supports Multiple Antenna (machine translated copy) (Year: 2011).*

(Continued)

*Primary Examiner* — Parth Patel
(74) *Attorney, Agent, or Firm* — Spectrum IP Law Group LLC

(57) ABSTRACT

An access node of a 3GPP LTE-based wireless communication network comprises a transmitter portion that transmits downlink control information (DCI) to at least one wireless station of a plurality of wireless stations wirelessly accessing the node as a Multi-User Multiple Input Multiple Output (MU-MIMO) wireless communication network. The DCI comprises at least one code word indicating a rank of a channel matrix between the transmitter portion of the node and the wireless station greater than 4 and a spatial-related configuration for the wireless station. In one exemplary embodiment, the transmitter portion transmits the DCI from one substantially localized geographical transmission point forming a single-cell access point for the plurality of wireless stations. In another exemplary embodiment, the trans- (Continued)

mitter portion transmits the DCI from multiple geographically substantially isolated transmission points forming a single-cell access point.

14 Claims, 4 Drawing Sheets

(51) Int. Cl.
  *H04L 5/00* (2006.01)
  *H04L 1/00* (2006.01)
  *H04B 7/0452* (2017.01)
  *H04B 7/06* (2006.01)

(52) U.S. Cl.
  CPC .............. *H04L 1/0026* (2013.01); *H04L 1/06* (2013.01); *H04L 5/0023* (2013.01); *H04L 5/0051* (2013.01)

(56) References Cited

U.S. PATENT DOCUMENTS

| | | | | |
|---|---|---|---|---|
| 2010/0074207 A1* | 3/2010 | Pan | ...... | H04B 7/0452 370/329 |
| 2010/0173659 A1* | 7/2010 | Shin | ...... | H04B 7/0452 455/500 |
| 2010/0177742 A1* | 7/2010 | Tang | ...... | H04B 7/0417 370/335 |
| 2011/0103324 A1* | 5/2011 | Nam | ...... | H04L 5/0048 370/329 |
| 2011/0149765 A1* | 6/2011 | Gorokhov | ...... | H04L 1/0026 370/252 |
| 2011/0158191 A1* | 6/2011 | Zhang | ...... | H04L 5/003 370/329 |
| 2011/0194536 A1* | 8/2011 | Kim | ...... | H04L 5/0023 370/335 |
| 2011/0237283 A1* | 9/2011 | Shan | ...... | H04L 5/0091 455/509 |
| 2011/0274197 A1* | 11/2011 | Zhu | ...... | H04L 1/0031 375/267 |
| 2012/0106595 A1* | 5/2012 | Bhattad | ...... | H04B 7/0421 375/146 |
| 2012/0188988 A1* | 7/2012 | Chung | ...... | H04J 13/00 370/335 |
| 2012/0195271 A1* | 8/2012 | Lee | ...... | H04L 5/003 370/329 |
| 2013/0021991 A1* | 1/2013 | Ko | ...... | H04B 7/0413 370/329 |
| 2013/0034064 A1* | 2/2013 | Nam | ...... | H04W 72/12 370/329 |
| 2013/0039332 A1* | 2/2013 | Nazar | ...... | H04W 72/04 370/330 |
| 2013/0235811 A1* | 9/2013 | Li | ...... | H04B 7/0452 370/329 |
| 2013/0265980 A1* | 10/2013 | Zhu | ...... | H04L 1/06 370/329 |

OTHER PUBLICATIONS

CN101834629B—A method and system for indicating the transmission parameters published Sep. 2010(machine translated copy) (Year: 2010).*
CA2765255A1—Mobile terminal apparatus, radio base station apparatus and communication control method—published Dec. 2010(machine translated copy) (Year: 2010).*

* cited by examiner

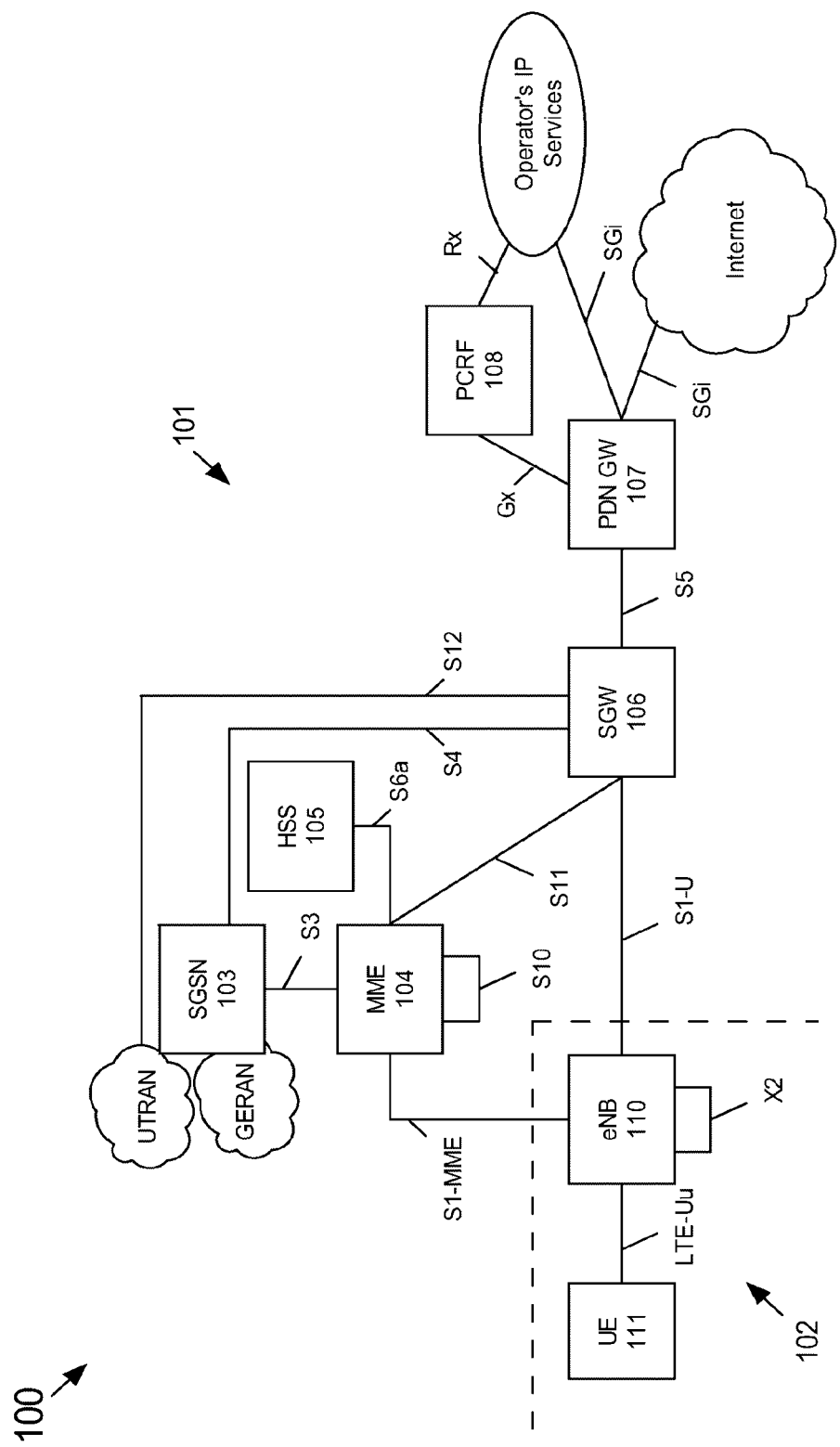
FIG. 1

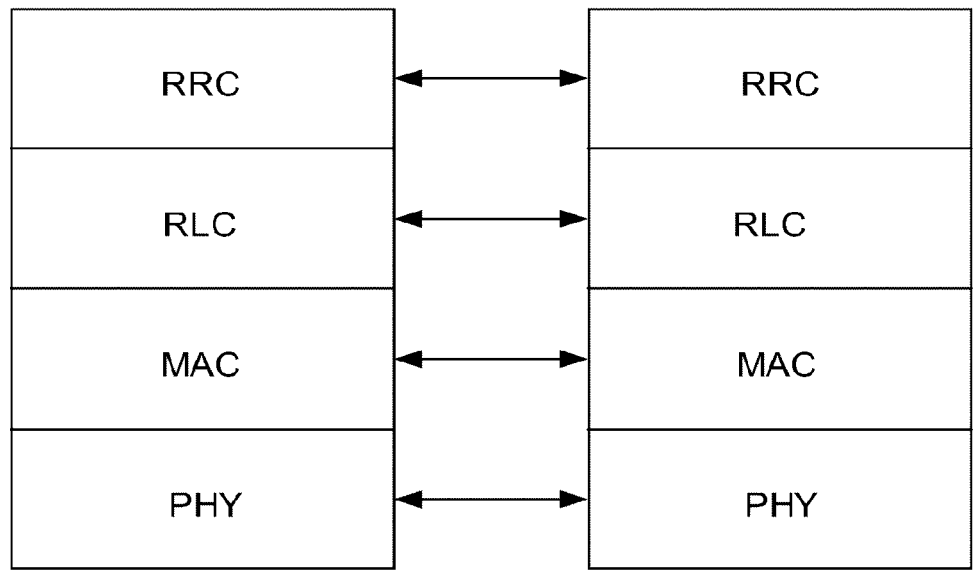
FIG. 2
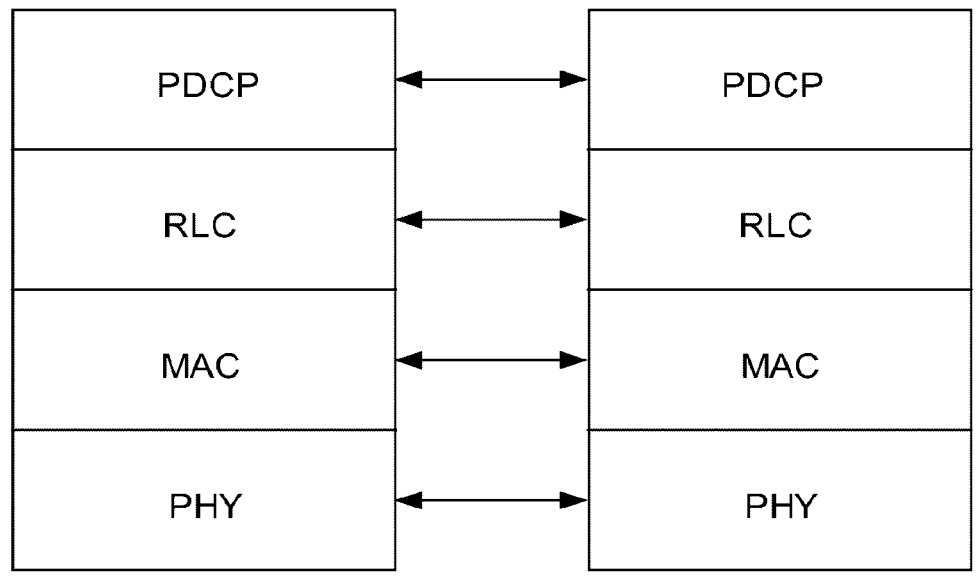
FIG. 3

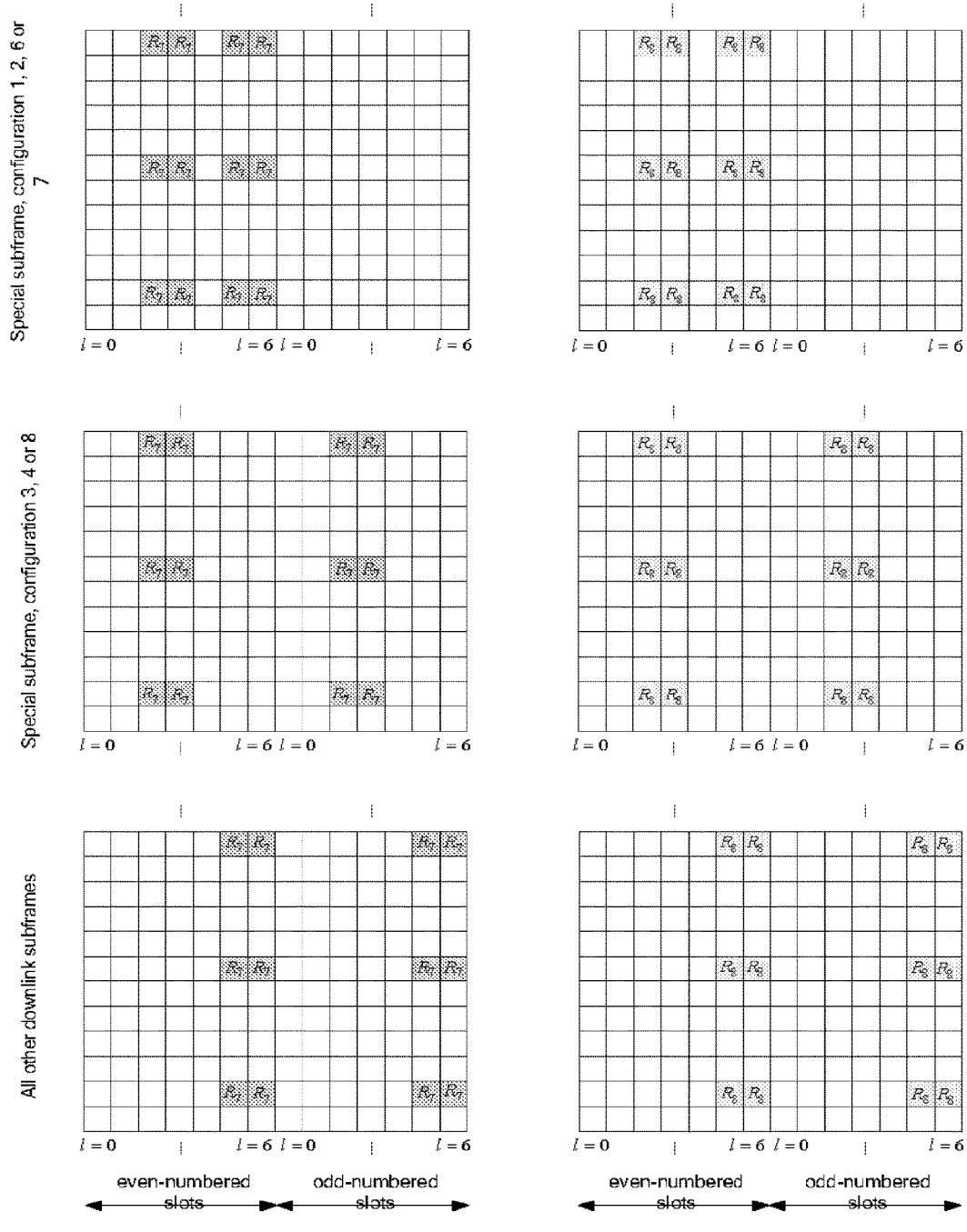
PRIOR ART
FIG. 4A
PRIOR ART
FIG. 4B

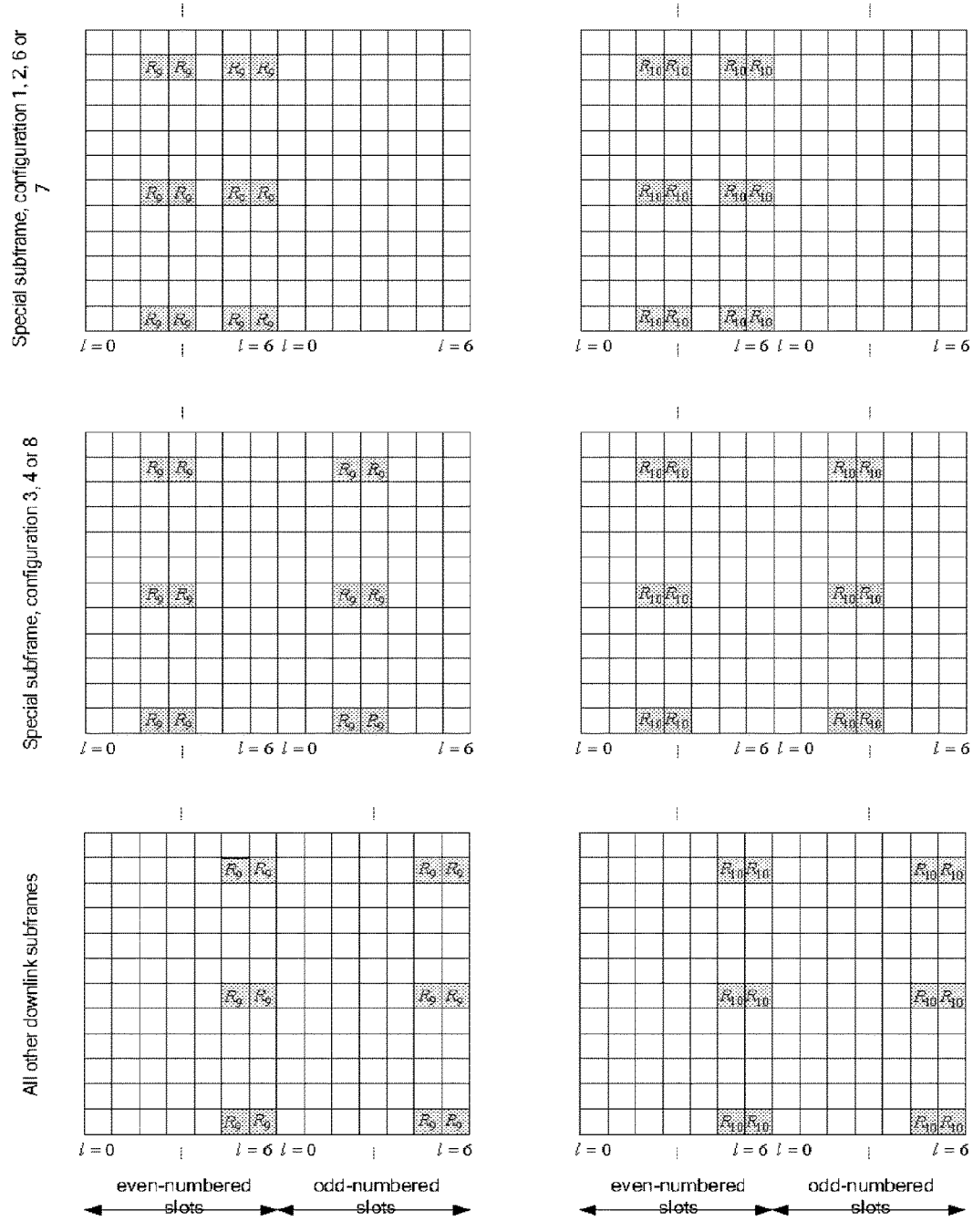
PRIOR ART
FIG. 4C
PRIOR ART
FIG. 4D

HIGHER ORDER MU-MIMO FOR LTE-A

CROSS REFERENCE TO RELATED APPLICATIONS

The present patent application is a continuation application of U.S. application Ser. No. 13/995,155, filed Jun. 17, 2013 which is the U.S. National Phase Application under 35 U.S.C. 371 of International Application No. PCT/US2011/053903, filed Sep. 29, 2011.

BACKGROUND

Multi-User Multiple Input Multiple Output (MU-MIMO) technology has been recognized as a technique to boost spectrum efficiency without significantly increasing infrastructure costs. For LTE-A Rel. 10, transmission mode 9 (TM9) has been introduced to support up to an 8-by-8 MIMO transmission. That is, eight Demodulation Reference Signal (DMRS) antenna ports are defined to demodulate up to rank 8 transmissions. Nevertheless, such an approach does not provide higher-order MU-MIMO modes.

DESCRIPTION OF THE DRAWING FIGURES

Claimed subject matter is particularly pointed out and distinctly claimed in the concluding portion of the specification. Such subject matter may, however, be understood by reference to the following detailed description when read with the accompanying drawings in which:

FIG. 1 shows a block diagram of the overall architecture of a 3GPP LTE network including network elements and standardized interfaces;

FIGS. 2 and 3 depict radio interface protocol structures between a UE and an eNodeB that are based on a 3GPP-type radio access network standard; and FIGS. 4A-4D respectively depict the mapping of UE-specific reference signals for antenna ports 7, 8, 9 and 10 (normal cyclic prefix).

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. "Coupled" may mean that two or more elements are in direct physical and/or electrical contact. "Coupled" may, however, also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. "Over" may, however, also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other. As used herein, the word "exemplary" means "serving as an example, instance, or illustration." Any embodiment described herein as "exemplary" is not to be construed as necessarily preferred or advantageous over other embodiments.

The subject matter disclosed herein relates to techniques for higher-order MU-MIMO than the current available in the solution standardized in 3GPP Technical Standard 36.211 for LTE-A Rel. 10.

FIG. 1 shows a block diagram of the overall architecture of a 3GPP LTE network 100 that includes network elements and standardized interfaces. At a high level, network 100 comprises a core network (CN) 101 (also referred to as the evolved Packet System (EPC)), and an air-interface access network E-UTRAN 102. CN 101 is responsible for the overall control of the various User Equipment (UE) connected to the network and establishment of the bearers. E-UTRAN 102 is responsible for all radio-related functions.

The main logical nodes of CN 101 include a Serving GPRS Support Node 103, the Mobility Management Entity 104, a Home Subscriber Server (HSS) 105, a Serving Gate (SGW) 106, a PDN Gateway 107 and a Policy and Charging Rules Function (PCRF) Manager 108. The functionality of each of the network elements of CN 101 is well known and is not described herein. Each of the network elements of CN 101 are interconnected by well-known standardized interfaces, some of which are indicated in FIG. 1, such as interfaces S3, S4, S5, etc., although not described herein.

While CN 101 includes many logical nodes, the E-UTRAN access network 102 is formed by one node, the evolved NodeB (eNB or eNode B) 110, which connects to one or more User Equipment (UE) 111, of which only one is depicted in FIG. 1. In one exemplary configuration, a single cell of an E-UTRAN access network 102 provides one substantially localized geographical transmission point (having multiple antenna devices) that provides access to one or more UEs. In another exemplary configuration, a single cell of an E-UTRAN access network 102 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 104 by an S1-MME interface and to SGW 106 by an S1-U interface.

The protocols that run between the eNBs and the UEs are generally referred to as the "AS protocols." Details of the various interfaces are well known and not described herein.

The eNB 110 hosts the PHYsical (PHY), Medium Access Control (MAC), Radio Link Control (RLC), and Packet Data Control Protocol (PDCP) layers, which are not shown in FIG. 1, and which include the functionality of user-plane header-compression and encryption. The eNB 110 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 110 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 111, generates pages for UEs 111 over the air, broadcasts system information, controls UE measurement reporting, such as the periodicity of Channel Quality Information (CQI) reports, and allocates cell-level temporary identifiers to active UEs 111. The RRC layer also executes transfer of UE context from a source eNB to a target eNB during handover, and provides integrity protection for RRC messages. Additionally, the RRC layer is responsible for the setting up and maintenance of radio bearers.

FIGS. 2 and 3 depict radio interface protocol structures between a UE and an eNodeB that are based on a 3GPP-type radio access network standard. More specifically, FIG. 2 depicts individual layers of a radio protocol control plane and FIG. 3 depicts individual layers of a radio protocol user plane. The protocol layers of FIGS. 2 and 3 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver, is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an JP packet header having relatively large and unnecessary control information in order to efficiently transmit IP packets, such as IPv4 or IPv6 packets in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally. Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Multi-User Multiple Input Multiple Output (MU-MIMO) technology has been recognized as a technique to boost spectrum efficiency without significantly increasing infrastructure costs. For LTE-A Rel. 10, transmission mode 9 (TM9) has been introduced to support up to an 8-by-8 MIMO transmission. That is, eight Demodulation Reference Signal (DMRS) antenna ports are defined to demodulate up to rank 8 transmissions. If the received signal can be described as:

$$Y=HPX+n$$

in which H is the transmission matrix for the channel, P is the precoding matrix, X is the transmitted signal vector, and n is a noise vector, then the "rank" equals number of columns in the precoding matrix P, and also equals to number of DMRS ports used.

The DMRS patterns for antenna ports 7, 8, 9 and 10 are depicted in FIGS. 4A-4D, which correspond to Figure 6.10.3.2.3 in the 3GPP Technical Specification (TS) 36.211, Draft Version 10.0.0, and depicts the mapping of UE-specific reference signals for antenna ports 7, 8, 9 and 10 (normal cyclic prefix). More specifically, FIGS. 4A-4D respectively depict the mapping of UE-specific reference signals for antenna ports 7, 8, 9 and 10 (normal cyclic prefix).

The DMRS for antenna port 7 (FIG. 4A) and antenna port 8 (FIG. 4B) overlap each other and occupy in total twelve resource elements (REs) in the depicted resource grids. Each element in a resource grid is called a Resource Element (RE) and is uniquely defined by the index pair (k,l) in a slot in which k=0, ..., $N_{RB}^{UL} N_{sc}^{RB}-1$ and l=0 ..., $N_{symb}^{UL}-1$ are the indices in the frequency and time domains, respectively. Resource element (k,l) on an antenna port p corresponds to the complex value $a_{k,l}^{(p)}$. Quantities $a_{k,l}^{(p)}$ corresponding to resource elements not used for transmission of a physical channel or a physical signal in a slot are set to zero.

The DMRS REs for antenna port 7 and for antenna port 8 consist of six pairs of REs such that each pair consists of two REs in two consecutive OFDM symbols. The sequences for antenna ports 7 and 8 are generated by first selecting one random QPSK sequence with a scrambling ID i, and then spreading each QPSK symbol with a length-2 Orthogonal Cover Code (OCC). For antenna port 7, the OCC is [1 1] and for antenna port 8 the OCC is [1 −1]. Thus, for each RE pair, the DMRS for antenna ports 7 and 8 are fully orthogonal, even if both DMRS sequences also share the same scrambling sequence.

The DMRS for antenna port 9 (FIG. 4C) and antenna port 10 (FIG. 4D) are fully orthogonal in the frequency domain with respect to DMRS for antenna ports 7 and 8, and generation of the sequence for DMRS for antenna ports 9 and 10 are similar to generation of the sequences for DMRS for antenna ports 7 and 8.

If the transmission rank is greater than 4, the total DMRS overhead does not increase. But, the four REs for DMRS on one subcarrier are used together to form one length-4 OCC. DMRS for antenna ports 7, 8, 11 and 13 occupy the same 12 REs and are referred as CDM Group 1. On the other hand, DMRS for antenna ports 9, 10, 12 and 14 occupy the other 12 REs, and are referred as CDM Group 2. The two original length-2 OCC sequences are viewed as two length-4 OCC sequences, specifically [1 1 −1 −1] and [1 −1 1 −1], and the two additional OCC sequences are [1 −1 −1 1] and [1 −1 −1]. Thus, the DMRSs within the same CDM Group are orthogonal to each other if the same scrambling sequence is used.

Downlink Control Information (DCI) is used by an eNode B to allocate resources for each transmission mode. The DCI format used by an eNode B to allocate resources depends on the particular transmission mode. DCI format 2C (DCI 2C) is designed to signal the scheduling grant for transmission mode 9 (TM9) and a 3-bit field is used to signal the spatial-related configurations to a UE. The signaling is designed so that the MU-MIMO is transparent to a UE in a way that the UE does not know if there are other UEs receiving data from the same resources through a different 3-bit signaling. DCI 2C includes fields for Modulation and Coding Scheme (MCS), New Data Indicator (NDI) and Redundancy Version (RV) fields for a maximum of two Transport Blocks (TBs). A particular combination of MCS/RV bits can disable one TB that results in a one code word transmission. It is mainly used in rank 1 transmission or in high rank retransmission. The meaning of the three-bit spatial indication depends on whether one code word or two code words are used.

Table 1 corresponds to Table 5.3.3.1.5C-1: Antenna port(s), scrambling identity and number of layers indication in 36.212 Rel. 10 v10.2.0 and defines the usage of each bit pattern for the 3-bit field. The left column of Table 1 defines the meaning of the 3-bit field when one code word is enabled, and the right column defines the meaning of the 3-bit field when two code words are enabled.

TABLE 1

Antenna port(s), scrambling identity and number of layers indication.

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

When one code word is enabled, values 0, 4, 5 and 6 are designed primarily for Single-User MIMO (SU-MIMO) up to rank 4 with one code word. The one code word rank 2 transmission is for retransmission only. Values 1, 2, 3 are designed primarily for MU-MIMO up to four UEs with each having rank 1. The DMRS patterns for values 0 and 1 are not fully orthogonal because both use the same OCC sequence, but use a different scrambling sequence.

When two code words are enabled, values 0, 2, 3, 4, 5, 6, 7 are designed for SU-MIMO up to rank 8, and value 1 is designed for MU-MIMO. With Values 0 and 1, it is possible to support maximum rank 4 MU-MIMO with each UE having rank 2 transmission. Similarly, the DMRS patterns for values 0 and 1 are not orthogonal to each other because they are only separated by a different scrambling ID.

According to the subject matter disclosed herein, higher-order MU-MIMO can be provided by expanding codeword values for Downlink Control Information (DCI) used by an eNode B to allocate resources for each transmission mode. In particular, the antenna ports are extended and the scrambling identity and layer indications in LTE-A Rel. 11 or beyond can be based on Table 2 or alternatively on Table 3, or a combination thereof. The higher-order MU-MIMO combinations set forth in Tables 2 and 3 are particularly useful for distributed antenna systems in which one cell contains multiple geographically isolated transmission points and each transmission point can serve one or more UEs simultaneously but the signaling bits are still defined for one cell thus share the same spatial signaling dimensioning.

TABLE 2

Antenna port(s), scrambling identity and number of layers
indication for higher-order MU-MIMO for LTE-A Rel. 11 and later versions.

| One Codeword: Codeword 0 enabled, Codeword 1 disabled | | Two Codewords; Codeword 0 enabled, Codeword 1 enabled | |
| --- | --- | --- | --- |
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8, $n_{SCID} = 0$ | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | 1 layer, port 11, $n_{SCID} = 0$ | 7 | 8 layers, ports 7-14 |
| 8 | 1 layer, port 11, $n_{SCID} = 1$ | 8 | 2 layers, ports 11, 13, $n_{SCID} = 0$ |
| 9 | 1 layer, port 13, $n_{SCID} = 0$ | 9 | 2 layers, ports 11, 13, $n_{SCID} = 1$ |
| 10 | 1 layer, port 13, $n_{SCID} = 1$ | 10 | 2 layers, ports 7-8, $n_{SCID} = 0$, 2 DMRS Group |
| 11 | 2 layers, ports 7-8, $n_{SCID} = 1$ | 11 | 2 layers, ports 11, 13, $n_{SCID} = 0$, 2 DMRS Group |
| 12 | 2 layers, ports 11, 13, $n_{SCID} = 0$ | 12 | 2 layers, ports 9-10, $n_{SCID} = 0$, 2 DMRS Group |
| 13 | 2 layers, ports 11, 13, $n_{SCID} = 1$ | 13 | 2 layers, ports 12, 14, $n_{SCID} = 0$, 2 DMRS Group |
| 14 | Reserved | 14 | 3 layers, ports 10, 12, 11 |
| 15 | Reserved | 15 | 4 layers, ports 11, 13, 12, 14 |

TABLE 3

Antenna port(s), scrambling identity and number of layers
indication for higher-order MU-MIMO for LTE-A Rel. 11 and later versions.

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8, $n_{SCID} = 0$ | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | 1 layer, port 7, $n_{SCID} = 2$ | 7 | 8 layers, ports 7-14 |
| 8 | 1 layer, port 7, $n_{SCID} = 3$ | 8 | 2 layers, ports 7-8, $n_{SCID} = 2$ |
| 9 | 1 layer, port 8, $n_{SCID} = 2$ | 9 | 2 layers, ports 7-8, $n_{SCID} = 3$ |
| 10 | 1 layer, port 8, $n_{SCID} = 3$ | 10 | 2 layers, ports 7-8, $n_{SCID} = 0$, 2 DMRS Group |
| 11 | 2 layers, ports 7-8, $n_{SCID} = 1$ | 11 | 2 layers, ports 11, 13, $n_{SCID} = 0$, 2 DMRS Group |
| 12 | 2 layers, ports 7-8, $n_{SCID} = 2$ | 12 | 2 layers, ports 9-10, $n_{SCID} = 0$, 2 DMRS Group |
| 13 | 2 layers, ports 7-8, $n_{SCID} = 3$ | 13 | 2 layers, ports 12, 14, $n_{SCID} = 0$, 2 DMRS Group |
| 14 | 1 layer, port 11, , $n_{SCID} = 0$ | 14 | 3 layers, ports 10, 12, 11 |
| 15 | 1 layer, port 13, $n_{SCID} = 0$ | 15 | 4 layers, ports 11, 13, 12, 14 |

The extra features provided by the additional signaling of Tables 2 and 3 include:

For one code word, values 0, 1, 2, 3, 7, 8, 9 and 10 in Table 2 support up to rank 8 MU-MIMO with each UE transmitting one layer. The first CDM Group 7, 8, 11 and 13 is used and both scrambling IDs ($n_{SCID}$) 0 and 1 are used. Table 3 only uses DMRS for antenna ports 7 and 8, but four scrambling IDs ($n_{SCID}$) are used 0, 1, 2 and 3. Scrambling IDs 2 and 3 are newly defined.

For one code word, values 0, 2, 7 and 9 in Table 2 and for values 0, 2, 14, and 15 in Table 3, up to rank 4 MU-MIMO is supported with each UE transmitting one layer, but with orthogonal DMRS.

For one code word, values 4, 11, 12 and 13 in both Table 2 and Table 3 up to rank 8 MU-MIMO is supported with each UE transmitting two layers using different DMRS and scrambling ID combinations.

For two code words, values 0, 1, 8 and 9 in both Table 2 and Table 3 support up to rank 8 MU-MIMO with each UE transmitting two layers and each layer is mapped to one code word.

For two code words, values 10, 11, 12 and 13 in both Table 2 and Table 3 supports up to rank 8 MU-MIMO with each UE transmitting two layers and the DMRS for four UEs are fully orthogonal because both CDM groups are used.

For two code words, for values 2 and 14, it is possible to pair two UEs with each having rank 3, and for values 3 and 15, it is possible to pair two UEs with each having rank 4.

Although the claimed subject matter has been described with a certain degree of particularity, it should be recognized that elements thereof may be altered by persons skilled in the art without departing from the spirit and/or scope of claimed subject matter. The claimed subject matter will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a user equipment (UE), comprising:
a baseband processor to decode downlink control information (DCI) received from a node of a network, wherein the DCI includes an indication of one or more antenna ports, a scrambling identifier (ID), a number of layers, and up to a length-4 orthogonal cover code (OCC) for the UE to transmit or receive a Multi-user Multiple-Input Multiple-Output (MU-MIMO) data signal; and
a memory to store the downlink control information;
wherein the downlink control information includes values corresponding to a table comprising:

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8, $n_{SCID} = 0$ | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | 1 layer, port 7, $n_{SCID} = 2$ | 7 | 8 layers, ports 7-14 |
| 8 | 1 layer, port 7, $n_{SCID} = 3$ | 8 | 2 layers, ports 7-8, $n_{SCID} = 2$ |
| 9 | 1 layer, port 8, $n_{SCID} = 2$ | 9 | 2 layers, ports 7-8, $n_{SCID} = 3$ |
| 10 | 1 layer, port 8, $n_{SCID} = 3$ | 10 | 2 layers, ports 7-8, $n_{SCID} = 0$, 2 DMRS Group |
| 11 | 2 layers, ports 7-8, $n_{SCID} = 1$ | 11 | 2 layers, ports 11, 13, $n_{SCID} = 0$, 2 DMRS Group |
| 12 | 2 layers, ports 7-8, $n_{SCID} = 2$ | 12 | 2 layers, ports 9-10, $n_{SCID} = 0$, 2 DMRS Group |
| 13 | 2 layers, ports 7-8, $n_{SCID} = 3$ | 13 | 2 layers, ports 12, 14, $n_{SCID} = 0$, 2 DMRS Group |
| 14 | 1 layer, port 11, $n_{SCID} = 0$ | 14 | 3 layers, ports 10, 12, 11 |
| 15 | 1 layer, port 13, $n_{SCID} = 0$ | 15 | 4 layers, ports 11, 13, 12, 14. |

2. The apparatus of claim 1, wherein up to rank 8 MU-MIMO is supported for the UE to transmit using one layer and four scrambling IDs.

3. The apparatus of claim 1, wherein up to rank 4 MU-MIMO is supported with orthogonal Demodulation Reference Signals (DMRS).

4. The apparatus of claim 1, wherein up to rank 8 MU-MIMO is supported for the UE to transmit using two layers using different Demodulation Reference Signals (DMRS) and scrambling ID combinations.

5. The apparatus of claim 1, wherein up to rank 8 MU-MIMO is supported for the UE to transmit using two layers, wherein each layer is mapped to one code word.

6. The apparatus of claim 1, wherein up to rank 8 MU-MIMO is supported for the UE to transmit using two layers such that the Demodulation Reference Signals (DMRS) are orthogonal.

7. The apparatus of claim 1, wherein the UE has rank 3 or 4 and is to be paired with another UE having rank 3 or 4, respectively.

8. An apparatus of an evolved Node B (eNB), comprising:
a baseband processor to encode downlink control information (DCI) for one or more user equipment (UE) devices on a network, wherein the DCI includes an indication of one or more antenna ports, a scrambling identifier (ID), a number of layers, and up to a length-4 orthogonal cover code (OCC) for the one or more UE devices to transmit or receive a Multi-user Multiple-Input Multiple-Output (MU-MIMO) data signal; and
a memory to store the downlink control information;
wherein the downlink control information includes values corresponding to a table comprising:

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8, $n_{SCID} = 0$ | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | 1 layer, port 7, $n_{SCID} = 2$ | 7 | 8 layers, ports 7-14 |
| 8 | 1 layer, port 7, $n_{SCID} = 3$ | 8 | 2 layers, ports 7-8, $n_{SCID} = 2$ |
| 9 | 1 layer, port 8, $n_{SCID} = 2$ | 9 | 2 layers, ports 7-8, $n_{SCID} = 3$ |
| 10 | 1 layer, port 8, $n_{SCID} = 3$ | 10 | 2 layers, ports 7-8, $n_{SCID} = 0$, 2 DMRS Group |
| 11 | 2 layers, ports 7-8, $n_{SCID} = 1$ | 11 | 2 layers, ports 11, 13, $n_{SCID} = 0$, 2 DMRS Group |
| 12 | 2 layers, ports 7-8, $n_{SCID} = 2$ | 12 | 2 layers, ports 9-10, $n_{SCID} = 0$, 2 DMRS Group |
| 13 | 2 layers, ports 7-8, $n_{SCID} = 3$ | 13 | 2 layers, ports 12, 14, $n_{SCID} = 0$, 2 DMRS Group |
| 14 | 1 layer, port 11, $n_{SCID} = 0$ | 14 | 3 layers, ports 10, 12, 11 |
| 15 | 1 layer, port 13, $n_{SCID} = 0$ | 15 | 4 layers, ports 11, 13, 12, 14. |

9. The apparatus of claim 8, wherein the DCI includes a configuration to support up to rank 8 MU-MIMO for the one or more UE devices to transmit using one layer and four scrambling IDs.

10. The apparatus of claim 8, wherein the DCI includes a configuration to support up to rank 4 MU-MIMO with orthogonal Demodulation Reference Signals (DMRS).

11. The apparatus of claim 8, wherein the DCI includes a configuration to support up to rank 8 MU-MIMO for the one or more UE devices to transmit using two layers using different Demodulation Reference Signals (DMRS) and scrambling ID combinations.

12. The apparatus of claim 8, wherein the DCI includes a configuration to support up to rank 8 MU-MIMO for the one or more UE devices to transmit using two layers, wherein each layer is mapped to one code word.

13. The apparatus of claim 8, wherein the DCI includes a configuration to support up to rank 8 MU-MIMO for the one or more UE devices to transmit using two layers such that the Demodulation Reference Signals (DMRS) are orthogonal for up to four of the UE devices.

14. The apparatus of claim 8, wherein the DCI includes a configuration for one UE device to have rank 3 or 4 to be paired with another UE device to have rank 3 or 4, respectively.

* * * * *